3,193,519
NOVEL AGGREGATE BINDERS
Albert M. Gessler, Cranford, and William J. Sparks, Westfield, N.J., assignors to Esso Research and Engineering Company, a corporation of Delaware
No Drawing. Filed Oct. 27, 1960, Ser. No. 65,269
10 Claims. (Cl. 260—33.6)

This application is a continuation-in-part of Serial No. 831,043, filed August 3, 1959, to Albert M. Gessler and William J. Sparks, now U.S. Patent No. 3,070,570, issued December 25, 1962.

This invention relates to novel compositions comprising aggregates and fillers bonded with certain thermoplastic synthetic resins and to methods for preparing the compositions.

It was discovered, and forms the subject matter of Serial No. 831,043, U.S. Patent No. 3,070,570, that thermoplastic compositions of steam cracked petroleum resin-bonded aggregates have suitable thermoplastic processability and, when shaped, compacted and cooled, have high strength and flexibility characteristics over a wide temperature range.

However, a problem found with such aggregate compositions is a tendency to crack when used in road surfaces and the like. This problem is not encountered with asphalt binders, and since the above binders have many properties superior to those of asphalt, solving of the cracking problem would render an already excellent binder system even better.

It has now surprisingly been discovered that the use of inert inorganic fillers in the binder of the above aggregate systems greatly reduces the tendency of the aggregate compositions to crack. In addition the use of such fillers has the additional advantage of requiring less petroleum resin binder per weight of aggregate, thus sharply reducing the cost of the total aggregate compositions.

The inert inorganic fillers utilized in the present invention include pigments and fillers of the type normally employed in bonded aggregate systems such as carbon blacks, clays of all types such as kaolin clay, whitings, silicas, ground limestone, vermiculite, diatomaceous earth and the carbonates, sulfates, and silicates of the metals of Groups II and III of the Periodic Table, such as magnesium, calcium, barium, aluminum and the like.

The particle size of the fillers ranges from 0.1 to 50 microns, preferably from about 1 to 30 microns, depending on the properties desired in the aggregate compositions. The smaller sizes can be obtained by subjecting the fillers to severe attrition, e.g. by ball-milling with steel balls or roll-milling one or several times through tight set steel rolls or stamping or any other means of obtaining severe attrition. The fillers are used in amounts ranging from 10 to 200, preferably 30 to 100 wt. percent based on the total weight of the binder system.

The steam cracked petroleum resins utilized in the binder systems to bind the aggregates and fillers of the invention are those given on pages 2 through 8 of parent application 831,043, U.S. Patent No. 3,070,570, issued Dec. 25. 1962. For the sake of completeness however, the properties of the resins are given below.

Various types of steam-cracked petroleum resins may be used for carrying out the invention, but generally any thermoplastic relatively linear type steam-cracked petroleum resin having a softening point between about 125° F. and about 230° F., preferably between 150° F. and 215° F., of low or no aromatic content and substantially free of cross-linking, can be used. These resins also should have a melt viscosity (cps.) of about 100–30,000, preferably about 150–20,000, at practical hot mixing and forming temperatures of about 200–500° F., preferably 250–400° F. These resins also desirably should have a cold/hot viscosity ratio (300° F./500° F.) below 40, preferably about 1–20. The average molecular weight of these resins is about 1,000 to 1,500; and their sp. gr. (25/25° C.) is about 0.96–0.98, and generally about 0.97.

From 1 to 10%, preferably 2 to 8% by weight of steam cracked petroleum resin binder is used based on the total weight of aggregate composition, i.e. based on the total weight of aggregate plus filler plus petroleum resin binder.

Although for many purposes it is preferred to use the above-mentioned thermoplastic linear type hydrocarbon resins alone as the sole constituent of the binder system, from about 1 to 40%, preferably about 5 to 20% by weight based on the weight of petroleum resin, of various types of additives can be employed, such as elastomeric modifiers, e.g., butyl rubber, Hevea, SBR, neoprene, nitrile rubber (NBR) etc., or lower mol. wt. plasticizers, e.g. natural and synthetic oils such as mineral oils, hydrocarbon oils such as naphthenic base oils and aromatic base oils, esters, such as aliphatic phthalates, adipates, pelargonates, phosphates, etc., ethers and polyethers such as polyvinyl butyl ether, etc., polyhydroxy compounds such as glycerol, ethylene glycol, di and trihydric phenols, etc., coal tar derivatives such as coumarone-indene resins and oils, fatty oils; waxes; and natural or synthetic resins, hydrogenated abietic acid esters, coumarone-indene resins, natural petroleum resins, thermal or catalytic-cracked petroleum resins (which have undesirably higher aromatic content, higher sp. gr. and higher cold/hot viscosity ratio (300° F./500° F.) than steam-crecked petroleum resins), chlorinated paraffin wax resins, styrene-isobutylene resins, or high styrene-low diene resins, etc. and/or 1 to 30% by weight, based on the weight of petroleum resin, of high melting polyolefins, e.g., polyethylene (low density) of 2,000–20,000 mol. wt., polypropylene of 50,000–100,000 mol. wt. One or more of the above additives can be employed. Such plasticizing or softening additives permit the use of linear thermoplastic resins of much higher softening point and larger amounts of elastomeric additives than would be practical without them.

The aggregates to be used according to the invention may be of numerous conventional types or certain specially adapted types, as will be discussed further herebelow. For thin sections or surface layers, e.g., about 1/16″ to 1/2″ or so, a fine aggregate should be used, such as a sand having a grading of about 1/4″ down to 100 mesh, or a finer sand ranging from 8 mesh to 100 mesh may be used; or even finer fractions may be used, such as 20 mesh to 100 mesh. For coarser sections, slabs or bulk articles, e.g., from 1/2″ to 1 foot, or 5 feet or more in thickness, with or without an over-lying finer surface coating, large crushed aggregates may be used, such as crushed stone, gravel and air-cooled slag, having either a mixed grading of 1/2″ to 3″, or 1/4″ to 2″ or 1/2″ to 1″, etc. Alternatively, if a fairly thick section, e.g. 2″ to 1 foot or more is to be used without any finer surface coating, the aggregate used may be composed of both coarse and fine aggregate such as a mixture of 100 parts by weight of coarse stone, and 80 parts by weight of sand. The above aggregates may be graded either for density and lowest voids, or for a controlled desired amount of voids, e.g. 3%, 5%, 8%, etc. voids.

Various methods may be used in carrying out the present invention, depending upon various factors such as the particular type of resin composition used, the type of aggregates used and according to the type of mixing equipment available. The preferred technique, referred to as hot plastic mixing, is to heat the resin binder system to be used, to a temperature about 100–300° F. above its softening point, until it has softened to a hot fluid consistency, and then stir the aggregate and filler, preferably dried and preheated, into it, preferably gradually, until the final composition is obtained.

Thus, for example, a steam-cracked petroleum resin having an average mol. wt. of about 1,100, which has a softening point of about 212° F. (by Ring-and-Ball Method, ASTM standards D36–26) may be heated to a temperature of about 300 to 450° F. and then a sand having a grading of about ¼" down to 100 mesh, and calcium carbonate, both preheated to a similar temperature, are gradually added with continued mixing until the mixture contains about 94% by weight of sand, 3% by weight of clay, and 3% by weight of resin which has been modified with 20–30% by weight of a naphthenic base oil such as Necton 60 (Handbook of Material Trade Names by Zimmerman and Lavine, 1953, page 386); and the mixture is substantially homogeneous. This hot mixture is then ready for use in forming blocks, slabs, or other articles, or for application to a road surface where it is then compacted by rolling or tamping or any other suitable method. Alternative resin compositions may be used, such as one having a softening point of 158° F. or 185° F. or a mixture of about 40 to 80% by weight of 212° F. softening point resin mixed with about 20 to 60% by weight of similar steam-cracked petroleum resin having a softening point of 158° F., each being polymerization products of a feed in which the reactants comprise essentially about 25% aliphatic dienes, and about 75% aliphatic alkenes. Another resin composition which can be used comprises about 10 to 50% of polypropylene having an average mol. wt. of about 50,000 to 100,000, remixed with about 50 to 90% by weight of steam-cracked petroleum resin having an average mol wt. of about 1,000 and having a softening point of about 158° F.

One advantage of adding some, e.g., 10–50%, based on the weight of petroleum resin, of a crystalline-type polymer such as crystalline polypropylenes to the steam-cracked petroleum resin as the binder for the aggregates, is that the resulting composition, when shaped, compacted and cooled, is substantially oil-resistant. This means, for instance, that it is resistant to softening by jet fuel spillage on airport runways, airplane carrier runway decks, etc., and also resistant to softening by gasoline, kerosene or lubricating oil, which may accidentally come in contact with paved surfaces around gasoline filling stations, repair garages, etc. For instance, slabs of such resin-polymer-bonded sand-filler aggregate, about 4' x 8' in area, and ½" or 1" thick can be precast or molded, in a factory, and then cemented in place as a complete floor covering in a commercial garage or at a service station, preferably using an ordinary asphalt cement or various available plastic cements as a grouting to insure a good bond between the slabs and the underlying floor surface.

Similar resin-sand compositions with or without polypropylene or other modifier, may be hot-molded in the shape of ordinary bricks or "concrete blocks," and used for building walls, floors, partitions, etc., or for special paving purposes, such as a surface coating on bridges, which are subject to excessive vibration, wide temperature fluctuations, etc., where concrete, asphalt paving and wooden blocks are not as satisfactory as desirable.

For paving highways, airport runways, airplane carrier decks, parking lots, bus stations, etc., such oil-resistant polypropylene-resin-sand-filler compositions may be hot-rolled directly in place, either as a thin surface layer, e.g., ¼", ½" or an inch or so thick, or, together with coarse aggregate, as a 2" to 8" or thicker load-supporting base layer, and then covered with a thin seal coat on the surface. Depending on the color of the fine aggregate used, or the dust filler used, the resin-bonded sand surface layer will be found to be lighter than conventionally used asphalt surfacing, and therefore will give better visibility for night driving, particularly when the roads are wet.

A great advantage of the present compositions is that the thermoplastic resins used are all pale yellow to essentially colorless, i.e. a Gardner color preferably as light as or lighter than 15, and therefore when mixed with sand, and filler, they can easily be given any desired color by adding a relatively small amount of a pigment. For instance, for a white, or light gray, a few (e.g. 0.5–5.0) percent of white titanium dioxide pigment based on the total weight of aggregate system may be used. For other purposes, a similar quantity red, yellow, orange, green, blue, or even black pigments may be used, etc., or for ornamental purposes, in manufactured articles, etc.

Another novel method of using the compositions of this invention, e.g. a mixture of a fine sand of about 20 mesh to 100 mesh or 200 mesh and filler, coated with about 4 to 6% or 8% of a steam-cracked petroleum resin of about 212° F. softening point, may be hot mixed and then sheeted out into thin sheets or films ranging from ¼" thick to ⅟₁₆", ⅟₃₂", by passing the hot mixture through one or more pairs of rolls cold enough to make the sheet maintain its shape, and additionally cooling, if necessary, with cold air, water spray, or a water bath, drying, and finally rolling up the resulting flexible strip into large rolls. These rolls, which may be any desired width, such as only 2" to 1 foot in width for marking traffic lines on highways, etc. up to 4 feet, 6 feet, 8 feet, or more in width for laying down a light-colored oil-resistant and jet-blast resistant surface coating (if it contains oil-resistant polypropylene, polyvinylchloride, etc. type of additive), on airport runways, airplane carrier decks, etc., or a surface coating to merely lighten up the color of an asphalt highway or to smoothen over a rough concrete highway. Such a strip roll material may also be used in place of conventional tar paper for covering sloping roofs, or, where they are especially advantageous, for flat roofs, because such resin-bonded sand is not subject to serious deterioration by oxidation and cracking as is the case with asphalt. For roofing purposes, either as large sheeting or as smaller roofing tiles, etc., one or two percent of carbon black may be added to the composition in order to stabilize against the depolymerizing effect of ultraviolet light and sunlight, or colorless ultraviolet light absorbers may be added.

The composition of this invention may also be used for paving the beach runways, beach groins, jetties and levees, either by hot rolling method, or coating with preformed thin slabs or strip rolls.

Numerous molded or extruded articles may be formed from these resin-bonded aggregate-filler compositions. For instance, floor tiles, wall tiles, or correspondingly larger slabs may be made. Conduit pipe may be extruded in various dimensions, e.g. from small sizes such as ½" inside diameter to larger and thicker conduits of 5" or 6" inside diameter. With a light-weight vermiculite filler, instead of or in addition to other fillers, these compositions make excellent sound-deadening thermal insulation. Acid-resistant battery boxes may readily be molded from these compositions. Likewise, smaller, thinner articles such as phonograph records, as well as numerous pans, buckets, bowls, or other containers, various tools, or tool-handles, doorknobs, telephone receivers, instrument housings, electrical insulators, etc., may be readily made by selection of appropriate thermoplastic steam-cracked petroleum resin and type and screen size of filler, within the purview of the present invention.

Larger or more bulky articles may also be formed, either by molding or stamping, e.g., railroad ties, large diameter pipes, e.g., 1 foot or 5 feet or more in diameter, with or without steel wire or mesh reinforcing for conducting water, or for use in sewage systems, or gas mains, or for transporting crude oil or refined petroleum liquids. Other hydraulic structures include water tanks, reservoirs, dam spillways, etc., or storage tank bottoms, etc. Precast structural columns, e.g. telephone poles, piles, etc. may be made. Such piles have the advantage that sections thereof are joinable by thermoplastic welding, i.e. by heat-softening the ends of two units which are then combined under suitable pressure and permitted to cool until solidified.

The present resin-bonded aggregate compositions may be further modified by the addition of a small amount, e.g. 10 to 75% by weight, of a volatile solvent, such as naphtha or kerosene, toluene, etc., sufficient to give fluidity for application by painting with a brush, or spray painting, or a more plastic consistency suitable for troweling in place, or by coating on flat surfaces as with a doctor blade, etc. by machine.

Relatively thin coatings, for instance of a steam-cracked petroleum resin-bonded sand-filler composition, may advantageously be applied by a hot rolling or hot pressing technique onto the surface of concrete blocks or cinder blocks, either just on the exterior side to be exposed to the rain and weather or in contact with wet earth as in a house foundation, or may be applied to both the interior and exterior surfaces, or if desired all of the surfaces of such blocks or construction slabs made of concrete, clay bricks, tiles, or even wood, may be coated with a relatively thin layer of these thermoplastic resin-bonded sand-filler compositions.

The compositions of the present invention, at least when used in substantial thicknesses, are relatively fireproof or fire-resistant, except when exposed to high temperatures over a long time. However, if desired to increase the fire resistance of articles made of the present compositions, various fireproofing materials may be incorporated such as highly chlorinated naphthalenes, phosphates, silicates, etc.

An additional method of using the compositions of this invention, not practical with materials available heretofore, is to make large sheets or slabs, containers, piping, etc. by a technique analogous to that used in making corrugated paper board, but using thermoplastic heat-sealing for bonding a flat sheet of resin-bonded filler-aggregate composition on either one side or both sides of a corrugated sheet of similar resin-bonded filler aggregate. Such corrugated sheets may be readily made while the sheet is still in a hot forming condition. For effecting the desired heat sealing, the outer edges of the corrugated sheet may be passed near or through a hot flame or other heating element, and the side of the flat sheet to be bonded therewith may also be heated at least sufficiently to make it tacky so that it will bond readily to the corrugated surface when contacted therewith under slight pressure. Laminated slabs of great strength can be made by bonding together two or more of the resulting corrugated slabs, with the corrugation "grain" at right angles to each other.

The details and the advantages of the invention will be better understood from a consideration of the following examples, which are given for illustration purposes only and are not meant to limit the invention.

EXAMPLE I

A Marshall pellet was prepared from 1146 grams of Ottawa sand and 54 grams of petroleum resin (Piccopale 100) (Handbook of Material Trade Names, Zimmerman and Lavine, Supplement I, 1956, page 184). The resin was added to the sand at 350° F. with stirring. The Marshall pellet was compacted using 25 blows of a 10# wt. falling 18" on each surface. The cooled pellet was hard and apparently well formed. The separation tendencies of the sand aggregate were tested by striking the surface of the pellet sharply, but gently, with an ordinary teaspoon. Sand particles quickly broke away and separated from the compacted pellet.

EXAMPLE II

The above experiment was repeated except that 54 grams of an oil (Coray 230, a highly aromatic oil) (Handbook of Material Trade Names, Zimmerman and Lavine, Supplement I, 1956, page 51) were mixed with the sand and resin. Sand still readily separated from the cooled pellet when the spoon impact test was applied.

EXAMPLE III

The same quantities of sand, petroleum resin, and oil as used in Example II were mixed with kaolin clay and the pellet prepared according to the process of Example I. No sand separated or chipped from the cooled Marshall pellet even after repeated and sharp striking with a teaspoon.

EXAMPLE IV

An oil paste having the following composition was prepared on a 3 roller paint mill:

| | Grams |
|---|---|
| Piqua limestone | 400.0 |
| Necton 60 (a naphthenic base oil) | 200.0 |
| Green pigment | 1.5 |

The resulting green paste was mixed with petroleum resins at 300–320° F. using the following formulation:

| | Grams |
|---|---|
| Piccopale 100 | 100 |
| Piccopale 70 | 100 |
| Green paste | 200 |

78 grams of the resulting binder was then mixed with 1122 grams of F.A.B.C. stone-sand aggregate according to the process of Example I except that the Marshall pellet was formed at 260° F. (F.A.B.C. is defined as a type of fine aggregate in New Jersey State Highway Department Standard Specifications for Road and Bridge Construction, including Addenda A (1941), pages 259 et seq.) with 50 blows on each surface. The Marshall pellet had the following properties at 140° F.

| | |
|---|---|
| Marshall stability | 1400#. |
| Marshall flow | 18.0 (in 0.1"). |

A similar Marshall pellet with asphalt (85–100 penetration) used in place of the paste-resin binder, gave the following properties at 140° F.

| | |
|---|---|
| Marshall stability | 1200#. |
| Marshall flow | 18.0 (in 0.1"). |

Hence it can be seen that the aggregate compositions of the invention have Marshall stabilities greater than, and Marshall flows as good as, pellets prepared with asphalt.

EXAMPLE V 78 grams of the binder of Example IV was mixed with 1122 grams of Ottawa sand and a Marshall pellet formed as shown in Example IV. In the spoon impact test no sand separated or chipped out from the bonded aggregate.

EXAMPLE VI

The following paste was prepared according to the process of Example IV on a 3 roller paint mill:

| | Grams |
|---|---|
| Piqua limestone | 400.0 |
| Necton 60 | 100.0 |
| Green pigment | 1.5 |
| Oleic acid | 3.0 |

The resulting green paste was mixed with petroleum resin in a container at 300–320° F., using the following formulation:

| | Grams |
|---|---|
| Piccopale 100 | 100.0 |
| Green paste | 165.0 |

When 78 grams of this paste-resin mixture was used as binder with 1122 grams of the F.A.B.C. aggregate system of Example IV, the following Marshall data were obtained at 140° F.:

| | |
|---|---|
| Marshall stability | 2500#. |
| Marshall flow | 11.5 (in 0.1"). |

EXAMPLE VII

The following paste was prepared by conventional techniques on a 3 roller mill:

| | Grams |
|---|---|
| Piqua limestone | 500 |
| Necton 60 | 100 |
| Yellow pigment | 1.5 |
| Oleic acid | 4.0 |

The resulting yellow paste was stirred with petroleum resin at 300-320 using the following formulation:

| | Grams |
|---|---|
| Piccopale 100 | 100.0 |
| Yellow paste | 200.0 |

A Marshall pellet was prepared according to the process of Example IV with this binder as follows:

| | Grams |
|---|---|
| F.A.B.C. aggregate | 1122.0 |
| Paste-resin blend | 78.0 |
| Necton 60 | 3.5 |

The following data were obtained at 140° F.

| | |
|---|---|
| Marshall stability | 2250# |
| Marshall flow | 11.5 (in 0.1″) |

EXAMPLE VIII

Using the green paste prepared in Example VI, a series of binders were prepared by blending the paste in various concentrations with petroleum resin (Piccopale 100). The resulting binders were then used with F.A.B.C. stone-sand aggregate using 6.5% by weight of binder. Marshall pellets were prepared according to the process of Example VI. The quantities of the components and the pellet testing data are given in Table I.

Table I
MARSHALL DATA AT 140° F.

| Percent Green Paste | Stability, # | Flow, 0.1″ | Resin, percent [1] | Grams resin, g.[2] | Resin, percent [3] |
|---|---|---|---|---|---|
| 25 | 20,100 | 11.0 | 80 | 61.5 | 5.0 |
| 50 | 8,600 | 13.0 | 67 | 52.3 | 4.4 |
| 75 | 4,350 | 14.0 | 57 | 44.5 | 3.8 |
| 100 | 3,500 | 14.5 | 50 | 39.5 | 3.3 |
| 125 | 2,250 | 13.5 | 44 | 34.3 | 2.8 |
| 150 | 2,000 | 12.5 | 40 | 31.2 | 2.6 |
| 200 | 1,750 | 10.5 | 33 | 25.7 | 2.2 |

[1] Percent based on total binder.
[2] Grams in 78 grams of binder used to form Marshall pellet.
[3] Percent based on aggregate-binder system.

It can be seen from the above table that various concentrations of fillers can be employed.

Modifications in the invention can be made by those skilled in the art without departing from the scope and spirit of the invention.

What is claimed is:

1. A composition comprising mineral aggregate the major portion of whose particles are retained by a 100 mesh screen bonded with a petroleum resin binder admixture prepared by mixing an inert inorganic filler whose particles are of an average size ranging from 0.1 to 50 microns and a hydrocarbon oil, admixing with said mixture a thermoplastic synthetic petroleum resin resulting from the polymerization of steam cracked olefins and diolefins having a softening point measured by the Ring-and-Ball Method of between about 125° F. and about 230° F., an average molecular weight of about 1,500, a specific gravity (25/25° C.) of between about 0.96 and about 0.98, and a carbon to hydrogen ratio of about 6.0 to about 7.0, the amount of petroleum resin admixture employed as the aggregate binder being sufficient to have between about 1 and about 10 weight percent of petroleum resin in the final bonded composition.

2. A composition as in claim 1 wherein the initial filler-oil mixture also contains a coloring pigment.

3. A composition as in claim 1 wherein the petroleum resin binder employed is a mixture of between about 50 and about 90 weight percent of petroleum resin and between about 50 and about 10 weight percent of a polymer having a molecular weight higher than that of the petroleum resin and selected from the group consisting of polyethylene, polypropylene, polyvinyl chloride, styrene-isobutylene copolymer, butyl rubber, natural rubber, styrene-butadiene rubbery copolymer, acrylonitrile-butadiene rubbery copolymer and another petroleum resin.

4. A composition as in claim 1 wherein the inorganic filler constitutes from 10 to 200 weight percent of the petroleum resin and the hydrocarbon oil is from 1 to 40 weight percent on the same basis.

5. A composition as in claim 1 wherein the petroleum resin has a softening point of about 212° F., an average molecular weight of about 1,100, a specific gravity of about 0.97, and a bromine number of about 8, and wherein the hydrocarbon oil is a naphthenic base oil and is present in from about 1 to about 40 weight percent based on the weight of the petroleum resin.

6. A process which comprises preparing a mixture of an inert inorganic filler whose particles are of an average size ranging from 0.1 to 50 microns and a hydrocarbon oil, admixing with said mixture a thermoplastic synthetic petroleum resin resulting from the polymerization of steam cracked olefins and diolefins, having a softening point measured by the Ring-and-Ball Method of about 125° F. and about 230° F., an average molecular weight of between about 1,000 and about 1,500, a specific gravity (25/25° C.) of about 0.96 to about 0.98, and a carbon to hydrogen ratio of about 6.0 to about 7.0, and preparing a composition comprising mineral aggregate, the major portion of whose particles are retained by a 100 mesh screen, bonded with the petroleum resin admixture in an amount sufficient to have between about 1 and about 10 weight percent of petroleum resin in the final bonded composition.

7. A process as in claim 6 wherein the initial filler-oil mixture also contains a coloring pigment.

8. A process as in claim 6 wherein the petroleum resin binder employed is a mixture of between about 50 and about 90 weight percent of petroleum resin and between about 50 and about 10 weight percent of a polymer having a molecular weight higher than that of the petroleum resin and selected from the group consisting of polyethylene, polypropylene, polyvinyl chloride, styrene-isobutylene copolymer, butyl rubber, natural rubber, styrene-butadiene rubbery copolymer, acrylonitrile-butadiene rubbery copolymer and another petroleum resin.

9. A process as in claim 6 wherein the inorganic filler constitutes from 10 to 200 weight percent of the petroleum resin and the hydrocarbon oil is from 1 to 40 weight percent on the same basis.

10. A process as in claim 6 wherein the petroleum resin has a softening point of about 212° F., an average molecular weight of about 1,100, a specific gravity of about 0.97, and a bromine number of about 8, and wherein the hydrocarbon oil is a naphthenic base oil and is present in from about 1 to about 40 weight percent based on the weight of the petroleum resin.

References Cited by the Examiner
UNITED STATES PATENTS

| | | | |
|---|---|---|---|
| 2,823,194 | 2/58 | McKay et al. | 260—82 |
| 2,914,501 | 11/59 | D'Ascoli | 260—33.6 |
| 2,934,452 | 4/60 | Sternberg. | |
| 3,070,557 | 12/62 | Gessler et al. | 260—41.5 |
| 3,070,570 | 12/62 | Gessler | 260—41 |

MORRIS LIEBMAN, *Primary Examiner.*

DANIEL ARNOLD, *Examiner.*